Patented May 19, 1931

1,806,531

UNITED STATES PATENT OFFICE

RUDOLF GOGARTEN, OF AACHEN, GERMANY, AND JOHN STANLEY ARTHUR, OF LONDON, ENGLAND, ASSIGNORS TO THE COMMERCIAL ALCOHOL COMPANY LTD., OF LONDON, ENGLAND, A CORPORATION OF GREAT BRITAIN

PRODUCTION OF DEGRADATION PRODUCTS FROM CELLULOSE, CELLULOSE-LIKE SUBSTANCES, AND CELLULOSE CONTAINING MATERIALS

No Drawing. Application filed May 23, 1930, Serial No. 455,138, and in Germany March 9, 1929.

This invention concerns a process for the recovery of decomposition products, e. g. polyoses and monoses and particularly fermentable sugar from cellulose (for example cellular tissue) and cellulose-containing substances (for example wood) by treating the same with volatile acids, especially hydrochloric acid and hydrochloric acid gas.

Many proposals have already been made for decomposing cellulose-containing materials with hydrochloric acid. One proposal for decomposing cellulose-containing materials consists in treating the starting material moistened with dilute hydrochloric acid or water, by means of hydrochloric acid gas under cooling and when solution of the cellulose has taken place effecting saccharification of the solution with steam or steam and inert gases. In this manner a mixture of undissolved matter, e. g. lignin and dilute hydrochloric acid-containing sugar solution is formed whereafter the lignin is separated from the solution and the latter subjected to de-acidification with hot inert gases, preferably hot air, the hydrochloric acid which is liberated thereby being recovered and again employed in the process.

The present invention has as its object to improve the aforesaid process principally by rendering it more economical in practice. According to the present invention the process for obtaining decomposition products from cellulose or cellulose containing materials by means of hydrochloric acid gas consists in subjecting the starting material having a moisture content not exceeding 50 per cent and preferably maintained between 20–40 per cent to decomposition with hydrochloric acid gas under cooling to low temperatures preferably below 0° C. and in saccharifying the decomposed material without removal of the hydrochloric acid with steam or a mixture of steam and inert gases or a mixture of steam and hydrochloric acid vapour.

The employment of the starting material with limited quantities of water offers the advantages that the consumption of hydrochloric acid gas can be maintained within comparatively narrow limits and that the decomposition can be effected in a very short time with the beneficial result that high yields of sugar especially of fermentable sugar can be obtained.

In order to carry the process according to the present invention into effect, a starting material containing only a little moisture, for example sawdust having a moisture content of less than 50%, preferably, for example, from 20–40%, is employed. Wood having a greater content of moisture is adjusted to the required value by preliminary drying; drier wood by moistening, for example by subjecting the same to a treatment with steam. The starting material is treated in suitable apparatus, for example in autoclaves which can rotate about their longitudinal axis, with hydrochloric acid gas until it is saturated or super-saturated. This treatment is effected with cooling and whilst the material is being moved, for instance in the rotating autoclave. The process of decomposition is stopped before a formation of slime takes place. Measures which might bring about or promote the formation of slime, such as, for instance, violent stirring or similar mechanical actions, are advantageously avoided.

It has been found that such starting material, the degree of moisture of which is very slight, and for instance amounts to only between 20 and 30%, can be worked up with especial advantage. Thus, for example, on the one hand the advantage is obtained that in consequence of the small liquid content in the originating material the amount of hydrochloric acid gas required is very small, complete decomposition being nevertheless obtained, while on the other hand the small quantity of liquid assists materially in maintaining the structure of the originating materials, e. g. sawdust. The maintenance of the structure of the originating material has the advantage that the loose product to be decomposed, which is not very moist and contains comparatively small quantities of hydrochloric acid, can, after it has been saccharified, be readily and rapidly freed from acid, since the hydrochloric acid presents a very large surface to the means for removing the acid, for instance vacuum or hot air, and such surface would otherwise have first to be created artificially, for instance by atomizing the solution. This feature of the invention is very important, because, as has already been stated, in accordance with our experience with known processes, these fail for the most part because of the difficulty of the economic removal, recovery and utilization of the hydrochloric acid.

The decomposition should be carried through at low temperatures such as down to 0° C. and below. Again, indirect cooling, obtained by passing cooling media through the autoclave provided with a double jacket, is beneficial. It is advantageous to operate in such a way that the hydrochloric acid gas prior to introduction is cooled or mixed with cooled inert gases such as air. Both measures may be combined if desired. It has proved advantageous to introduce into the decomposing vessel the hydrochloric acid gas or the mixture of gases containing hydrochloric acid gas in strongly cooled condition, for instance down to −10° C. to −15° C. Thus liquefied hydrochloric acid gas can be evaporated, thereby yielding on expansion very considerable reductions in temperature. The gas obtained in this way may be led through the double jacket of the decomposing vessel and then into its interior in order to decompose the mass.

The hydrochloric acid gas under pressure may be introduced into the closed and cooled autoclave. If the hydrochloric acid gas is in liquefied form and the requisite quantity of gas required for the decomposition is released into the autoclave it is found that the pressure existing in the interior of the autoclave accelerates the saturation of the water with hydrochloric acid gas, and thereby very materially hastens the decomposition.

Working at very low temperatures not only counteracts the undesirable formation of slime but also prevents the premature and undesirable formation of sugar.

Saccharification by direct heating is effected in a particularly advantageous manner by means of steam or a mixture of steam-hydrochloric acid vapour introduced without previous de-acidification of the mass which is stirred during the treatment. Experiments have shown that in this manner the hydrolysis can be effected in a very short time, for instance in 5–10 minutes and less. By the steam treatment the decomposition product may be brought very quickly up to the temperatures most favourable for saccharification, for instance temperatures of 60° C. to 75° C., while at the same time the hot condensate promotes the hydrolysis with avoidance of harmful excesses of water.

When steam or a mixture of steam-hydrochloric acid vapour is introduced into the decomposition product, hydrochloric acid vapour is driven off, and this is employed either for a fresh decomposition or it is conveyed to a drying and compressing apparatus and liquefied.

After the saccharification has been effected the autoclave is placed under reduced pressure or hot air or other gases are blown through, while heat is provided by heating the double jacket. The hydrochloric acid vapour passing over is condensed by cooling and part of the condensate required for the steam saccharification is conveyed to a hydrochloric acid evaporator apparatus and there converted into the form of vapour for a fresh saccharification. The remaining, almost dry end-product can, after neutralization of the remaining acid, be used directly as a cattle food. If desired, the decomposed product may be subjected to lixiviation to remove the soluble constituents, and washing waters of previous lixiviations may advantageously be used for this purpose. By evaporating the solution enriched by several lixiviations, products are obtained which can also serve as cattle food or for the preparation of bacterial cultures, etc.

If it is desired to prepare monoses, the material in the autoclave, still containing for instance from 1 to 2% of hydrochloric acid, may be subjected to treatment with steam at normal or increased pressure. Alternatively the material may be lixiviated and the sugar-containing solution boiled in the presence of very small quantities of acid at normal or increased pressure. If the removal of acid has been carried too far, the quantity of acid required for the hydrolysis may be added in the form of sulphuric acid which can easily be precipitated out again. The sugar solution is either worked up to sugar or subjected to fermentation in known manner to obtain alcohol.

The following example will serve to illustrate how the process of this invention may be carried into effect;

100 kgs. of sawdust with 30% moisture content (corresponding to 70 kgs. of dry sawdust and 30 kgs. of water) are treated in a rotary autoclave provided with a double jacket which is cooled, with so much hydrochloric acid gas from liquefied hydrochloric acid that saturation takes place. This treatment requires from 40 to 60 minutes and results in the formation of about 30 to 45 litres of a hydrochloric acid of 42–45%. The mixture of hydrochloric acid and sawdust is then brought up to a temperature of about 60° C. to 75° C. by blowing in about 10 kgs. of steam or a mixture of steam and hydrochloric acid vapour. This treatment required up to 10 minutes or less if it is carried on under increased pressure. Heat is also provided through the double jacket, which is heated to about 80° C. The combined heat treatment results in 20–30% of the hydrochloric acid being liberated in the form of gas and this is re-utilized in the process. At the end of the steam treatment a vacuum of about 40–100 mm. of mercury is applied to the vessel and the hydrochloric acid is distilled off at about 40° C., and then condensed. The residue which is now almost completely dry contains 35–45 kgs. of sugar, 25–35 kgs. of lignin and still contains 1 to 2% of hydrochloric acid. This quantity of acid can, if desired, be still further reduced or practically removed by evacuation, but the reduction or removal is unnecessary if the sugars contained in the residue are to be converted to monoses. The residue is either treated with steam under pressure up to 3 atmospheres or it is lixiviated with water or wash waters of previous lixiviations. The filtrate is then boiled at normal or under increased pressure.

As repeated experiments have shown, the process yields recoveries of sugar of 50 to 60% and more in relation to the dry sawdust. By conversion of the sugar into monoses products are obtained which can be fermented up to 90% and more.

That the process is economic is shown by the facts that only very small quantities of hydrochloric acid gas have to be employed and that the saccharified product may be readily freed from acid which may be re-utilized in the process.

It has further been found that by suitable application of hydrofluoric acid the process can likewise be carried through satisfactorily.

Claims:

1. The method of producing sugar from cellulose containing substances of moisture content from 20% to 50%, comprising the steps of treating the initial material with a volatile acid suitable for the hydrolysis of cellulose, in amounts sufficient to effect the decomposition, the step being carried out at such low temperature that the formation of sugar is prevented, then as a second step, hydrolyzing the decomposed material to form sugar by direct treatment with dry steam at a suitable pressure, to avoid harmful excess of water, and a third step, deacidifying the mixture to purify the product, the expelled volatile acid being used over again in the process.

2. The process as defined in claim 1 in which the decomposition during the first step takes place at an increased pressure, and hydrogen chloride is the volatile acid used to effect the decomposition, the said hydrogen chloride being supplied at low temperature.

In testimony whereof we affix our signatures.

RUDOLF GOGARTEN.
JOHN STANLEY ARTHUR.